Figure 1:
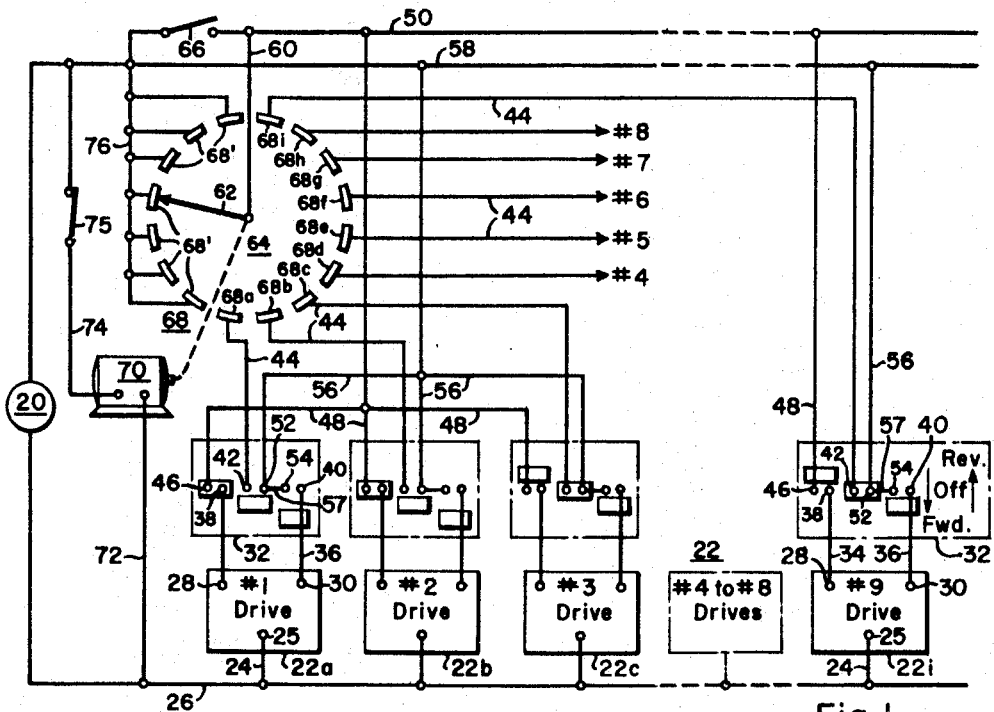

Dec. 6, 1960     M. A. SCHULTZ ET AL     2,963,590
REGULATING SYSTEM
Filed Aug. 7, 1957

WITNESSES
Edwin E. Bassler
Wm. B. Sellers

INVENTORS
Mortimer A. Schultz
& George W. Nagel
BY Donald Smith
ATTORNEY

# United States Patent Office 2,963,590
Patented Dec. 6, 1960

2,963,590
REGULATING SYSTEM

Mortimer A. Schultz and George W. Nagel, Pittsburgh, Pa., assignors to Westinghouse Electric Corporation, East Pittsburgh, Pa., a corporation of Pennsylvania Filed Aug. 7, 1957, Ser. No. 676,737

15 Claims. (Cl. 307—41)

The invention presently under consideration relates to a regulating or control system and, more particularly, to a system adapted for operation in conjunction with a plurality of electrical motors or other electric current utilizing means.

The control system of the character described is arranged in one example thereof for use with a number of linear-motion devices which are each employed for driving a linear-control element. These control elements may be provided in any desired form or configuration and in certain applications are formed with a rod-like or tubular configuration and arranged for insertion into a sealed or pressurized vessel for controlling a reaction or process being carried on within the vessel. When dealing with certain types of such reactions, the linear-motion devices are actuable independently of one another to provide a segregated controlling arrangement relative to certain areas within the vessel and also to afford finer or coarser adjustments of the controlling mechanism by moving one or more of the controlling elements as the case may be. The linear motion or other motive devices, depending upon applications thereof which are not in any way limitative of the invention, may be employed individually for actuating any suitable valved means, damping means, or the like, which means are arranged individually or collectively, or both, for controlling any desired reaction or process which is amenable to regulation in this matter.

The invention is equally adapted for use with a group of any other type of electric motive means, wherein it is desired to operate the motive means at progressively slower or faster speeds as additional ones thereof are energized by the regulating system disclosed herein. For an example, the invention is applicable to a plurality of motor-operated valves wherein it is desired to open the valves more slowly as additional valves are operated.

In the case of a nuclear power plant, a reaction vessel is provided wherein a critical quantity of a fissionable isotope such as $U^{233}$, $U^{235}$ or $Pu^{239}$ is maintained, which material is capable of sustaining a chain reaction when subjected to fission by thermal neutrons. A plurality of controlling elements, usually in the form of rods and containing a quantity of neutron absorbing material, are arranged for insertion into the interior of the reactor vessel for movement relative to the fissionable material contained therewithin. The control rods frequently are arranged for insertion downwardly into the reactor for slowing or terminating the chain reaction as desired and are withdrawable upwardly of the reactor in order to increase the reaction. In carrying out most of the adjustments of the control rods for controlling the aforesaid chain reaction, several or all of the control rods are moved more or less at the same time.

In prior control rod driving systems, the driving mechanisms, which usually took the form of linear-motion devices actuating the individual control rods, were energized such that the speed or rate of control rod travel was independent of the number of control rods being moved at a given instant. Therefore, when a number or all of the control rods were moved at one time in the upward direction in order to increase the reactivity of the reactor, there was always an imminent danger that the chain reaction would be increased at too great a rate with obvious disastrous consequences. Therefore, in many applications it has been found desirable to provide a constant rate of control rod movement in the direction, for example downwardly, which slows the chain reaction and to afford a variable rate of control rod movement in the opposite direction, for example upwardly, which increases the rate of the chain reaction. In this arrangement of the invention, a regulating system is provided whereby the speed of all operating control rods is made to vary with the number, in any combination thereof, of the control rods which are being so operated at any given instant.

To effect this variation in speed with the number of control rod driving mechanisms being actuated, it has been proposed to utilize a poorly regulated power supply for the control rod driving mechanisms such that the voltage will be reduced to each motor as additional motors are actuated. The reasons for not employing a poorly regulated power supply system are that, if the voltage is reduced to each motor, some types of motors tend to lose torque and that only modest reduction ratios of speed can be obtained between the conditions of one motor operating and of all motors operating. Another suggested arrangement for effecting variation in controlling element speed or for securing adequate compressional ratios includes feeding synchronous alternating current driving mechanisms from a variable frequency source and of changing the frequency of the source downwardly as additional motors are energized. This latter arrangement is impractical, however, because of the necessarily complex equipment required.

In view of the foregoing, it is an object of the invention to provide a regulating system for plurality of electrical driving means or other current utilizing means wherein the speed or output thereof is proportional to the number of driving means or current utilizing means being energized at a given time.

Another object of the invention is to provide a regulating system whereby the speed of a plurality of reversible driving means is reduced in proportion to the number of driving means being actuated in one direction only of their driving movement.

A further object of the invention is to provide a regulating system for a plurality of electrical driving means wherein the speed of movement in one direction thereof of the elements being driven by the driving means varies at a given rate with the number of driving means being energized at a given instant, and wherein the speed of movement in the other or opposite direction of the elements is substantially constant or varies at a different rate in accordance with the number of driving means energized.

Still another object of the invention is to provide a controlling system for a nuclear power plant wherein the controlling elements for the reactor are arranged to move in at least one direction at a speed which varies inversely with the number of controlling elements being actuated at a given time.

Still another object of the invention is to provide a regulating system wherein either a given variable speed of the controlling elements or a relatively constant rate of movement, or some other rate of movement, can be selected readily.

Figure 2:
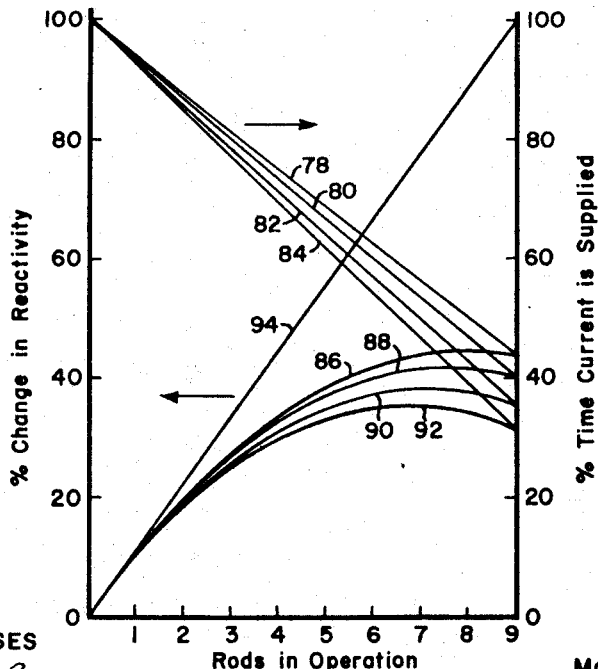

These and other objects, features and advantages of the invention will be made apparent during the ensuing description of exemplary modifications of the invention, with the description being taken in conjunction with the accompanying drawings, wherein:

Figure 1 is a schematic circuit diagram of one form of regulating system arranged in accordance with the invention; and Fig. 2 is a graph showing the comparative reduction ratios of the aforesaid driving means when regulated according to differing illustrative forms of the invention.

Within the contemplation of the present invention, a regulating circuit arrangement is provided for use with a plurality of electrical driving means or other current utilizing devices. The regulating system is based upon a time-sharing principle whereby each driving means receives power for a smaller interval as additional driving means are connected into the circuit. In one arrangement of the invention, this time-sharing principle is utilized only when the elements being moved by the driving means are moved in one direction, or in the case of a nuclear reactor, only when the controlling elements are being withdrawn therefrom to increase the reactivity of the reactor. Accordingly, normal speed of movement of the elements is obtained when the same are being moved in the opposite direction or are being inserted into the reactor. Additional means are provided for shunting or bypassing the time-sharing mechanism when required in special situations in order to afford a substantially constant rate of movement of the controlling elements as more or less of the driving means are connected in the circuit.

Referring now more particularly to Fig. 1 of the drawings, the exemplary form of the invention illustrated therein comprises a source of electrical power 20 and a plurality of electrical motive means 22 with nine being employed in this form of the invention. The motive means 22 are connected by way of conductors 24 and terminals 25 to a supply bus 26, which, in turn, is coupled to the source 20. Each of the motive means includes well-known reversing circuitry of which the terminals 28 and 30, respectively, are coupled to a three-position double-pole switch 32 employed for each motive means 22. The aforesaid reversing circuitry, which can be arranged for either alternating or direct current operation depending upon the character of the source 20 and of the motive means 22, is associated with the motive means 22 such that the latter is operated in a given direction, for example the forward direction, when the terminals 28 and 25 of the motive means are coupled to the source 20, and in another or the reverse direction when the terminals 30 and 25 are so coupled. More specifically, the terminals 28 and 30 of each driving means are connected by way of conductors 34 and 36, respectively, to switch contacts 38 and 40. A remaining switch contact 42 of this polarity is coupled through a conductor 44 to the time-sharing means 64 presently to be described for variably and intermittently supplying electrical current to the motive means 22. A switch contact 46 of opposite polarity and paired with the aforesaid switch contact 38 is connected through a conductor 48 to a common bus 50. The two remaining switch contacts 52 and 54, having this opposite polarity, are paired respectively with the contacts 42 and 40 and are coupled by way of conductors 56 and 57 to a supply bus 58.

The three-position switch 32 associated with each driving means 22 is arranged to be actuated manually or by any suitable means (not shown) to close the switch contacts 38 and 46 which serves to connect the associated motive means 22 through conductors 48, 50 and 60, to a rotating contact 62 of a current distributing means or time-sharing mechanism indicated generally by the reference character 64. When the three-position switch 32 is actuated to bridge the switch contacts 40 and 54, the associated driving mechanism 22 is connected across the supply buses 26 and 58 and is operated in the reverse direction thereof by means of its internal reversing circuitry coupled to the terminal 30. Finally, when each switch 32 is actuated to its intermediate or off position whereat its contacts 42 and 52 are bridged, its associated motive means 22 is disconnected from the circuit and in its stead part of the current distributing means 64 is coupled through the conductors 44 and 56 and the closed pair of switch contacts 42 and 52 to the supply bus 58.

It is contemplated in addition that a motive means or other electric current utilizing device, not having a reversible characteristic, can be coupled to the switch 32 such that the current utilizing device is connected to the source 20 through the time-sharing means 64 at one of the switch "on" positions but is connected directly to the source 20 at the other of the switch "on" positions. In the latter arrangement, of course, the bypassing switch 66 need not be employed. By the same token, when employing the last-mentioned non-reversible motive means or current utilizing devices, it will be obvious that the paired contacts 40 and 54 of each switching means 32 can be omitted. Thus each switching means 32 then will have only one each of "on" and "off" positions relative to the aforesaid non-reversible motive means or current utilizing devices. The segments 68a–68i are then coupled to the source 20 through either the "on" or "off" positions of the switches 32 depending upon whether increased or decreased average current, respectively, is desired to be supplied to the current utilizing devices as additional such devices are energized. Where increased average current is desired, however, an additional pair of contacts (not shown) are associated with the aforesaid "on" position of the switch, but insulated from the contacts 38 and 46 thereof, whereby the associated segment or conducting means of the current distributing means 64 is coupled to the source 20.

In this example, the bus 50 is connected through a single-throw, single-pole switch 66 to the supply bus 58 in order that the time-sharing current distributing means 64 can be shunted from the system when, in the event of any contingency, it is desired to move the element controlled by the motive means 22 at a substantially constant speed independent of the number of motive means 22 being actuated. Accordingly, when the switch 66 is closed and the contacts 38 and 46 of one or more of the switches 32 are bridged, the rate of movement of the elements driven by the associated motive means 22 has the same constant characteristic as the rate of movement thereof when the switch contacts 40 and 54 are bridged but movement is in the opposite, or in this case, the forward direction. This latter statement, of course, is based upon the assumption that the internal circuitry, which is associated with the terminals 28 and 30, of each motive means 22 permits substantially the same speed of the motive means in either direction of movement thereof.

One form of the current distributing means 64 comprises a commutator having a plurality of segments 68 spaced about the periphery thereof and arranged to be contacted successively by the aforesaid rotating contact 62, which is driven by a suitable driving means, for an example, an electric motor 70. The motor 70 desirably is coupled by means of conductors 72 and 74 and an on-off switch 75 to the supply buses 26 and 58, respectively. As indicated heretofore, the contact 62 of the current distributing means 64 is coupled in series with each of the motive means 22, through the common bus 50, when the pair of associated switch contacts 38 and 46 are bridged, with the motive means 22 being connected in parallel between the commutator and bus 26 when switch 66 is open. More specifically, a number of the commutator segments 68' are tied together and are connected to the supply bus 58 by a conductor 76 with seven of the commutator segments 68' being so arranged in this example of the invention.

The remaining commutator segments 68a to 68i, which correspond in number to that of the respective motive means 22a to 22i, are each coupled through the associated conductor 44 to the respective switch contact 42 of each motive means switch 32. As stated heretofore, when each switch 32 is actuated to its intermediate position to bridge the switch contacts 42 and 52, its associated motive means is disconnected from the buses 50 and 58 and will be deenergized. However, at this latter position of the switch 32 the associated one of the commutator segments 68a to 68i is energized by connecting it through the bridged switch contacts 42 and 52 to the supply bus 58. It follows then, whenever one of the motive means 22a to 22i is actuated in either the forward or reverse direction thereof by bridging either the switch contacts 38 and 46 or 40 and 54, respectively, that the associated one of the commutator segments 68a to 68i is disconnected from the supply bus 58. Therefore, assuming when the contacts 38 and 46 of each switch 32 are bridged, that the element being driven by the motive means 22 will be moved in its forward direction, or upwardly in the case of the aforedescribed nuclear reactor, one of the associated commutator segments 68a to 68i will be disconnected from the supply bus 58, as each motive means 22a to 22i is operated. As a result, when all of the motive means 22a to 22i are being actuated at any given time, all of the commutator segments 68a to 68i will be disconnected from the supply bus 58 and only that potential supplied to the permanently connected commutator segments 68′ will be transferred to the rotating contact 62. Therefore, all of the motive means 22a to 22i will be energized as the contact 62 is rotated but only for that proportion of the time in which the contact 62 engages the permanently connected segments 68′. It will be obvious that the segments 68′ can be replaced by a continuous contact (not shown) but occupying the same total area as that of all the segments 68′. It will also be apparent that the time-sharing means 64 can be provided with a greater or lesser number of smaller or larger segments respectively or that some of the segments 68′ can be decoupled from the conductor 76 and tied to selected ones of the deenergizable segments 68a to 68i in order to lend greater effect to energizing or deenergizing the aforesaid selected segments. With this latter arrangement, of course, a non-linear rate of speed reduction is obtained instead of the linear reduction ratios represented by the curves 78, 80, 82 and 84 of Fig. 2, presently to be described. At such time, then, current can be supplied to all of the motive means 22 only 7/16 or 43.7% of the time.

As better shown by curve 78 of Fig. 2, the proportion of the time in which current is supplied to the remaining motive means 22, as one or more mechanisms are disconnected from the circuit, increases linearly to the condition whereby when only one driving mechanism is being energized, current is supplied thereto approximately 15/16 or 93.7% of the time. It will be obvious that a greater or lesser percentage of speed reduction can be obtained by employing a commutator having a greater or lesser number of equal segments than that shown. When utilizing 15, 14 or 13 such segments, for example, the speed of the driving mechanisms 22 is decreased at progressively greater rates as more of the driving mechanisms 22a to 22i are actuated. Accordingly, curves 80, 82 and 84 are presented to illustrate the differing time-sharing conditions, or speed-reduction ratios, afforded by employment of 15, 14 or 13 commutator segments, respectively. These curves are based upon the use of nine driving mechanisms in each case.

In one illustrative application of the invention, the regulating system thereof is intended for use with a plurality of motive means 22 in the form of electric motors whose speed is substantially constant. In this arrangement, the regulating system is operated with the contact 62, of its time-sharing or current distributing means 64, rotating rather slowly, for an example, in the neighborhood of one to ten r.p.m. Consequently, each of the aforesaid electric motors, when energized by its associated switch are operated intermittently, with the off-time being dependent upon the number of segments 68 which are disconnected. As indicated previously, the number of deenergized segments is related directly to the number of motors which are coupled across the buses 26 and 50 by the switches 32. The effective speed reduction of each of the aforesaid constant speed motors is then dependent upon the number of these motors which are being operated at a given time.

Pursuant to another application, the regulating system is adaptable for use with a plurality of variable speed motors representing the group of motive means 22. In the latter application, the contact 62, however, is rotated at a relatively high speed so that the voltage output supplied to the variable speed motors from the time-sharing means 64 is reduced effectively. The extent of effect voltage reduction is dependent, however, upon the variable number of segments 68 which are disconnected in the manner described heretofore. It will be appreciated that the armature 62 is rotated at sufficient speed, in this example, to prevent serious loss of torque in the variable speed motors during the off-time, that is to say when the armature is in momentary contact with one or more segments 68 which are deenergized at a given time.

In still other applications of the invention it is contemplated that a progressive speed increase of the electric motive means be obtained as each additional motive means 22 is energized in either or both directions of its movement. This is accomplished by providing a modified switch (not shown) for each motive means, which latter-mentioned switch is similar to the switch 32, with the exception that the pairs of switch contacts 38, 46 and 42, 52 can be bridged simultaneously. Accordingly, the effective speed of the energized motive means is increased, instead of decreased as described heretofore, as each additional motive means is energized by the current distributing means 64. This follows from the energization of an additional segment 68, in this arrangement, as each additional motive means 22 is energized. The latter-mentioned switches, of course, are provided each with an "off" position whereby the corresponding motive means can be deenergized as desired.

When the regulating system of the invention is employed to provide, in the manner described previously, a factor of safety in the operation of a nuclear reactor, the system is arranged such that the control rods of the reactor are driven individually by the motive means 22. Thus, when the motive means are operated in their reverse direction, by bridging the associated switch contacts 40 and 54, the control rods are arranged to be inserted into the reactor vessel at a substantially constant speed regardless of the number of driving mechanisms 22 being operated. On the other hand, when the motive means are operated in their forward directions, by bridging switch contacts 38 and 46, the associated control rods are withdrawn from the reactor at a varying rate which is dependent upon the number of driving mechanisms being energized at any given instant. Thus, when a larger number of the control rods are being withdrawn from the reactor, which, of course, increases the reactivity thereof, these control rods can be moved only at a slower effective rate, inasmuch as current is being supplied to their energized driving mechanisms for smaller proportions of the time.

As better shown in Fig. 2, the increments of increase in reactivity of the nuclear reactor, are progressively decreased, as each additional one of the motive means is connected to the regulating system. This fact is illustrated fully by comparing each one of the curves 86, 88, 90 and 92 corresponding with employment of commutators having 16, 15, 14 or 13 segments, respectively, with the reactivity curve 94 illustrating the change of reactivity when the regulating system of the invention is not utilized and the rate of control rod movement is substantially constant and independent of the number of control rods being moved. In the operational conditions illustrated by these latter-mentioned curves, a total of nine control rods and associated driving mechanisms likewise are employed.

In the following table some of the data employed in the graphical illustration of Fig. 2 are tabulated:

| No. Rods Operating | No. of Segments | | | | No Regulation |
|---|---|---|---|---|---|
| | 13 | 14 | 15 | 16 | |
| | Percent Change in Reactivity | | | | |
| 1 | 10.2 | 10.3 | 10.4 | 10.4 | 11.1 |
| 2 | 18.8 | 19.1 | 19.3 | 19.5 | 22.2 |
| 3 | 25.6 | 26.2 | 26.6 | 27.1 | 33.3 |
| 4 | 30.8 | 31.8 | 32.6 | 33.3 | 44.4 |
| 5 | 34.2 | 35.7 | 37.0 | 38.2 | 55.6 |
| 6 | 35.9 | 38.1 | 40.0 | 41.6 | 66.7 |
| 7 | 35.9 | 38.9 | 41.4 | 43.7 | 77.8 |
| 8 | 34.2 | 38.1 | 41.4 | 44.4 | 88.9 |
| 9 | 30.8 | 35.7 | 40.0 | 43.7 | 100.0 |

It has been assumed, for purposes of preparing the tabulation, that the rate of reactivity change in a nuclear power plant is 100% when all of the control rods are moved at substantially unvarying speeds, such as is the case when the time-sharing distributing means 64 is shunted out of the circuit by closing the switch 66 (Fig. 1). The table lists the reactivity change rates which are made available, respectively, by operating one to nine, inclusive, of the control rods, to increase in this example the reactivity of a nuclear reactor, and by operating the motive means 22 therefor through time-sharing means employing respectively 13, 14, 15 and 16 commutator segments. For purposes of comparison, the data tabulated above include also the figures for percentage change in reactivity of the nuclear plant when the regulating system of the invention is not being employed.

It is to be understood that each of the reverse terminals 30 of the motive means 22 can be connected to the common bus 50 and to the time-sharing means 64 as by omitting the conductors 57 and coupling the switching contact 54 to the common bus 50 instead of to the supply bus 58, in order to provide regulation of each driving mechanism in either direction of its movement. Alternatively, the terminals 30 and their associated switch contacts 54 and 40, with the conductors 57 being omitted in this modification also, can be coupled to a separate time-sharing or current distributing means (not shown) which is similar to the current distributing mechanism 64 and which is coupled in parallel therewith but which is arranged with a different number of commutator segments in order to provide a differing rate of speed regulation for the driving mechanisms 22 when operated in their reverse directions. It is also contemplated that the aforesaid parallel-connected time-sharing means can be arranged respectively to induce effective speed reduction in one operational direction of the motive means 22 and to induce effective speed increase in the other direction.

In view of the foregoing, it will be apparent that a novel and efficient regulating system has been disclosed herein. The regulating system employs a minimum of component parts and is readily adaptable for use with various types of motive means or other current utilizing means to provide effective speed regulation therefor. Although not limited thereto, the regulating system is particularly adaptable for use in controlling a nuclear power reactor for which it is desirable to provide a considerable safety factor when increasing the reactivity thereof.

Numerous modifications of the regulating system disclosed herein will occur to those skilled in the art without departing from the spirit and scope of the invention. Accordingly, it is intended that the descriptive matter herein be characterized as illustrative of the invention and not as limitative thereof.

Accordingly, what is claimed as new is:

1. A regulating system for a plurality of electric current utilizing means, said system comprising current distributing means having a rotatable contact, means for rotating said contact, a plurality of conductive means associated with distributing means and arranged to be engaged by said contact, the number of said conductive means being greater than that of said current utilizing means, a source of electrical potential, said contact being coupled to said source in series with a parallel arrangement of said current utilizing means, a switching means for each of said current utilizing means, each said switching means having at least one pair of contacts coupled to said current utilizing means and to said rotatable contact, respectively, and having another pair of contacts coupled to said source and to one of said conductive means, respectively, and the remainder of said conductive means being coupled directly to said source.

2. A regulating system for a plurality of electric current utilizing means, said system comprising current distributing means having a rotatable contact, means for rotating said contact, a source of electric potential, a plurality of conductive means associated with said distributing means and arranged to be engaged by said contact, the number of said conductive means being greater than that of said current utilizing means, switching means for each of said current utilizing means, said switching means being arranged to deenergize at least one of said conductive means when the associated one of said current utilizing means is energized, and circuit means arranged to couple said current utilizing means through said contact, said conductive means, and said switching means to said source, whereby the period of energization of said current utilizing means is dependent upon the number of said conductive means that are energized.

3. A regulating system for a plurality of current utilizing means, each of said means having reversible characteristics and including circuitry for effecting said reversal, said system comprising a commutator having a rotatable contact, means for rotating said contact, a plurality of commutator segments disposed about the periphery of said commutator, the number of said segments being greater than that of said current utilizing means, a source of electric potential, a switching means for each of said current utilizing means, said switching means being operable to couple said current utilizing means in a given one of said characteristics to said contact, one of said commutator segments being coupled through another position of said switching means to said source of electric potential, each of said current utilizing means having its other characteristic coupled through still another position of said associated switching means to said source, and the remainder of said commutator segments being connected directly to said source.

4. A regulating system for a plurality of current utilizing means, each of said means having reversible characteristics and including circuitry for effecting said reversal, said system comprising a commutator having a rotatable contact, means for rotating said contact, a plurality of commutator segments disposed about the periphery of said commutator, the number of said segments being greater than that of said current utilizing means, a source of electric potential, a switching means for each of said current utilizing means, said switching means being operable to couple said current utilizing means in a given one of said characteristics to said contact, one of said commutator segments being coupled through another position of said switching means to said source of electric potential, each of said current utilizing means having its other characteristic coupled through still another position of said associated switching means to said commutator contact, and the remainder of said commutator segments being connected directly to said source.

5. A regulating system for a plurality of current utilizing means, each of said means having reversible characteristics and including circuitry for effecting said reversal, said system comprising a commutator having a rotatable contact, means for rotating said contact, a plurality of commutator segments disposed about the periphery of said commutator, the number of said segments being greater than that of said current utilizing means, a source of electric potential, a switching means for each of said current utilizing means, said switching means being operable to couple said current utilizing means in a given one of said characteristics to said contact, one of said commutator segments being coupled through another position of said switching means to said source of electric potential, said given characteristic is coupled additionally to said source through a switch connected in bypassing relationship with said contact and said commutator segments, each of said current utilizing means having its other characteristic coupled through still another position of said associated switching means to said source, and the remainder of said commutator segments being connected directly to said source.

6. A regulating system for a number of current utilizing means, said system comprising an electric current distributor having a plurality of energizable segments, a source of electric potential, circuit means for coupling each of said current utilizing devices and selected ones of said segments, respectively, through individual switching means to said source to energize said current utilizing means in accordance with the number of said segments that are energized, said switching means each being operable to connect at least one of said segments to said source when said associated current utilizing means is disconnected therefrom, and the remainder of said segments being connected directly to said source.

7. A regulating system for a plurality of current utilizing means, said system comprising an electric current distributor having a plurality of energizable segments, a source of electric potential, means for coupling each of said current utilizing devices and selected ones of said segments, respectively, through individual switching means to said source, said switching means each being operable to connect at least one of said segments to said source when said associated current utilizing means is disconnected therefrom, said switching means each being further arranged to couple said associated current utilizing means directly to said source in bypassing relationship with said current distributing means, and the remainder of said segments being connected directly to said source.

8. A regulating system for a number of current utilizing means, said system comprising an electric current distributor having a plurality of energizable segments, a source of electric potential, circuit means for coupling each of said current utilizing devices and selected ones of said segments, respectively, through individual switching means to said source to energize said current utilizing means in accordance with the number of said segments that are energized, said switching means each being operable to connect at least one of said segments to said source when said associated current utilizing means is connected thereto, and the remainder of said segments being connected directly to said source, whereby the period of energization of each of said current utilizing means is dependent upon the number of energized segments.

9. A regulating system for a number of current utilizing means, said system comprising a source of electric power, switching means coupled to each of said current utilizing means and having "on" and "off" positions for individually energizing and deenergizing said current utilizing means, regulating means connected in said system between said source and said switching means for determining the average voltage supplied to said current utilizing means when energized, circuit means for coupling said switching means and said regulating means to said source, and additional circuit means connecting said switching means and said regulating means, said additional circuit means being so arranged that said average voltage being supplied to selectedly energized ones of said current utilizing means is altered in response to at least one of said switching means being at a given one of said "on" and "off" positions.

10. In a regulating system for a number of current utilizing means, the combination comprising an electric current distributor, a plurality of conductive means associated with said distributor, a source of electric power, circuit means for coupling at least one of said conductive means to said source, switching means coupled to each of said current utilizing means and having "on" and "off" positions for individually energizing and deenergizing said current utilizing means, and additional circuit means for coupling the remainder of said conductive means through said switching means to said source at a given one of said "on" and "off" positions and for coupling said current utilizing means through said switching means and said current distributor to said source.

11. A regulating system for a number of current utilizing means, said system comprising a source of electric power, switching means coupled to each of said current utilizing means and having an "off" position and at least two "on" positions for individually energizing and deenergizing said current utilizing means, regulating means connected in said system between said source and said switching means for determining the average voltage supplied to said current utilizing means when energized, circuit means for coupling a portion of said switching means and said regulating means in series to said source and for coupling one of said "on" positions directly to said source, and additional circuit means connecting said switching means portion and said regulating means, said additional circuit means being so arranged that said average voltage being supplied to selectedly energized ones of said current utilizing means is altered in response to at least one of said switching means being at a given one of said "off" position and the other of said "on" positions.

12. A regulating system for a number of current utilizing means, said system comprising a source of electric power, switching means coupled to each of said current utilizing means and having an "off" position and a pair of "on" positions for individually energizing and deenergizing said current utilizing means, a first regulating means connected in said system between said source and said switching means including one of said "on" positions for determining an average voltage supplied to said current utilizing means when energized at said one switching means "on" position, a second regulating means connected in said system between said source and said switching means including the other of said "on" positions for determining a differing average voltage supplied to said current utilizing means when energized at said other switching means "on" position, electrical circuitry for coupling said switching means and said first and said second regulating means to said source, and circuit means coupling said first and said second regulating means with said switching means including said one and said other "on" positions, respectively, said circuit means being so arranged that said first-mentioned average voltage being supplied to selectedly energized ones of said current utilizing means from said first regulating means is altered in response to at least one of said switching means being at a given one of said "off" position and said one "on" position, and said circuit means being further arranged so that said second-mentioned average voltage being supplied to selectedly energized ones of said current utilizing means from said second regulating means is altered in response to at least one of said switching means being at a given one of said "off" position and said other "on" position.

13. A regulating system for a number of current utilizing means, said system comprising an electric current distributor having a plurality of energizable segments, switching means having first and second positions for respectively energizing and deenergizing said current utilizing means, circuit means for coupling said current utilizing means and selected ones of said segments through said first position of said switching means to a source of electric potential to energize said current utilizing means in accordance with the number of segments that are energized, and said switching means being movable to said second position to couple at least one of said segments to said source and to decouple its associated current utilizing means from said source so that the period of energization of each of said current utilizing means is dependent upon the number of energized segments.

14. A regulating system for a number of current utilizing means, said system comprising an electric current distributor having a plurality of energizable segments, switching means having first and second positions for respectively energizing and deenergizing said current utilizing means, circuit means for coupling said current utilizing means and selected ones of said segments through said first position of said switching means to a source of electrical potential to energize said current utilizing means in accordance with the number of said segments that are energized, said switching means being movable to said second position to couple at least one of said segments to said source and to couple its associated current utilizing means to said source so that the period of energization of each of said current utilizing means is dependent upon the number of energized segments.

15. A regulating system for a plurality of current utilizing means, each of said means having reversible characteristics and including circuitry for effecting said reversal, said system comprising an electric current distributor having a plurality of energizable segments, switching means having at least three positions for each of said current utilizing means, each of said switching means being movable to one of said three positions to couple its current utilizing means and a given one of said characteristics to a source of electric potential through said distributor, at least one of said segments being coupled through the second position of each of said switching means directly to said source, and each of said current utilizing means having its other characteristic coupled through the third position of its associated switching means to said source.

References Cited in the file of this patent

UNITED STATES PATENTS

| | | |
|---|---|---|
| 1,872,155 | Masek | Aug. 16, 1932 |
| 2,627,012 | Kinsella et al. | Jan. 27, 1953 |